Patented Jan. 4, 1949

2,457,847

UNITED STATES PATENT OFFICE 2,457,847

TALL OIL-CELLULOSE ETHER COMPOSITION

Warren Stubblebine, Manheim Township, Lancaster County, Pa., assignor to Armstrong Cork Company, Lancaster, Pa., a corporation of Pennsylvania No Drawing. Application July 31, 1943, Serial No. 496,966

14 Claims. (Cl. 260—17)

This invention relates to a composition of matter such, for example, as one suitable for use in the manufacture of floor and wall coverings and the like.

I have found that by modifying tall oil, which consists essentially of a mixture of rosin acids, fatty acids, and unsaponifiable material obtained as a by-product in the sulfate process of paper making and refined from black liquor, with a cellulose ether selected from the group, consisting of ethylcellulose and benzylcellulose and subsequently curing the mass with heat, a tough composition is formed which is useful as a binder for floor and wall coverings, gasket compositions, shoe findings, such as midsoles, platform soles, and the like, and for many other purposes.

By suitable proportioning of the binder ingredients and also by selection of the filler ingredients and their proportioning with the binder, the composition may be made soft, tough, resilient, and rubbery or may be made hard and strong. The binder composition may be mixed with or modified by the incorporation of other materials, such as oxidized oil linoleum cement, for example, in the preparation of resilient wall or floor coverings. If the binder is to be used in the manufacture of floor tiles, resins, such as the coumarone indene resins, known generally as cumar resins, may be incorporated to impart certain desired physical characteristics. Oxidized and polymerized resins have also been incorporated into the mixture with beneficial results. The binder generally contains a major amount of the modified tall oil-cellulose ether mixture; the oxidized linseed oil cement, resins, and other modifying agents for the binder being incorporated in minor amounts. The desirable physical properties of my composition are thus utilized to best advantage.

In preparing my composition, the tall oil and cellulose ether are heated to about 300° F. accompanied by violent agitation. This heating is continued until a compatible mixture is obtained. This generally requires in the order of one hour's time. Preferably, the tall oil constitutes a major portion by weight of the mixture and is modified with a minor amount of cellulose ether. As a specific example, the tall oil may comprise 60% to 70% of the composition and ethylcellulose 30% to 40%. Such a composition is tough and resilient, is of a brownish color, and resembles linoleum cement. It has the toughness of natural rubber but is considerably softer. Upon incorporating suitable fillers in this mass and thereafter forming the product into a sheet and curing, an article possessing physical characteristics similar to linoleum is produced.

As a specific example of a composition suitable for use as a floor or wall covering, the following is given:

| | Parts by weight |
|---|---|
| Unrefined tall oil | 200 |
| Ethylcellulose | 100 |

The tall oil and ethylcellulose are placed in a heated mixing kettle and heating, accompanied by rapid agitation, is effected for about one hour at 300° F. This treatment is effective for completely dissolving the tall oil and ethylcellulose to form a compatible mixture. This product, if permitted to cool, would form a brown mass of a rubbery character having considerable strength and toughness. The heated mixture, however, is charged into a mixer such as a Werner-Pfleiderer machine and the following fillers and pigments are added thereto.

| | Parts by weight |
|---|---|
| Binder prepared as above | 175 |
| Serpentine | 225 |
| Ground limestone | 210 |
| Cork dust | 50 |
| Coloring pigments | 45 |

Mixing is effected in this machine for about 30 minutes and the mixed composition is discharged to a so-called german mixer which is effective for obtaining a uniform distribution of the binder over the filler particles. This usually takes about 10 or 15 minutes, depending upon the type of fillers employed, the volume in the batch, and the effectiveness of the mixing. After a homogeneous mixture has been obtained, the mass is discharged and fed to a two-roll scratcher which breaks up the composition into particles suitable for calendering. The scratched mass is fed to a heated calender and at this point a backing such as burlap or cotton fabric, asphalt saturated felt, or the like may be applied. The back roll of the calender is preferably maintained at 100° F. or less and the face roll is heated to about 250° to 300° F. so as to obtain a high gloss surface on the face of the product. The material is then delivered to a curing stove or oven heated to a temperature of about 190° F. Satisfactory curing is effected in about 4 days.

This mixture handles well on the mixing tackle and sheets readily to a high gloss surface. The composition has a "high binding value" permitting the use of relatively large percentages of fillers, in the order of 60% to 80% of the total weight. In this respect the composition differs materially from the products obtained by plasticizing ethylcellulose with commercial plasticizers for with such plastized ethylcellulose products, good binding value cannot be obtained where more than about 40% of filler is employed.

The finished product prepared in the foregoing manner has physical characteristics similar to linoleum. It is better than linoleum in its resistance to alkalis such as those encountered when the covering is cleaned with harsh soaps and cleaning powders. This may be determined in accordance with the indentation or seasoning test of Federal Specification LLL-L-367, dated September 15, 1942. In the indentation test, a disc of the covering material is supported upon a steel plate and a pressure of 3,200 pounds per square inch is applied to the upper surface of the sample for a period of 30 seconds by means of a flat-ended cylindrical steel bar 0.178 inch in diameter. The load is lowered gently until the bar is in full contact with the sample and the sample in full contact with the plate. After 30 seconds, the load is quickly and completely removed. Sixty minutes after removal of the load, the residual indentation is measured to the nearest thousandth of an inch and calculated as the percentage of the original thickness. This percentage figure is known as the per cent of residual indentation and, in accordance with the Federal Specification referred to, must not exceed 10%. The penetration of the bar into the sample at the end of the 30 seconds application of pressure is also measured and this is known as the initial penetration. While the Federal specifications have no specific provision for initial penetration, the floor covering industry generally considers a product unsatisfactory if the initial penetration is greater than 50%. Where the terms "initial penetration" and "residual indentation" are used herein, I mean the initial penetration and residual indentation determined in accordance with the foregoing procedure.

The sodium hydroxide alkali resistance test is made by immersing the specimen to be tested in a 2% sodium hydroxide solution at 70° F. for 18 hours. The sample is then removed, wiped dry, and initial penetration and residual indentation are determined in accordance with the foregoing procedure.

In such sodium hydroxide tests, linoleum completely dissolves in about 6 hours. With my composition there is some softening effect but the composition is not destroyed and the initial penetration is less than 50%. This establishes that this product is an improvement over linoleum and will more successfully withstand cleaning with harsh soaps and cleaning powders. An initial penetration up to 75% under this sodium hydroxide test would indicate a usable covering but for best results, a figure of not more than 50% is desirable.

In the manufacture of a floor tile, the binder may be composed of:

| | Parts by weight |
|---|---|
| Unrefined tall oil | 50 |
| Ethylcellulose | 40 |
| Cumar resin C-3 [1] | 25 |

[1] A light-colored coumarine indene resin having a melting point of 125 to 135° C. by the cube in mercury method.

The mixture is heated as in the first example to obtain a uniform compatible mixture and the heated mixture is charged into a Werner-Pfleiderer mixer where the following fillers and pigments are incorporated:

| | Parts by weight |
|---|---|
| Binder prepared as above | 100 |
| Serpentine | 150 |
| Limestone | 100 |
| Asbestos | 20 |
| Clay | 70 |
| Pigment | 15 |

The tile is formed generally in the manner referred to in the first example above except that a backing is not applied. The product is harder and less flexible than the sheeted type floor covering, since it is sold in flat tile-like elements and is not rolled.

As an example of a product suitable for use as a midsole or platform sole in shoes, the following is given:

| | Parts by weight |
|---|---|
| Unrefined tall oil | 50 |
| Benzylcellulose | 40 |
| "Aroclor" (chlorinated diphenyl) | 15 |

In the preparation of this binder, the tall oil, benzylcellulose, and chlorinated diphenyl are charged into a heated mixing kettle and agitation, accompanied by heat, is effected until a homogeneous mixture results. The mass is then cooled down and fillers such as 100 to 125 parts by weight of 30-40 mesh cork particles are incorporated by mixing in a suitable mixer such as a Werner-Pfleiderer machine or on a two-roll rubber mill. Thereafter, the product is formed into a sheet with or without a facing or facings of fabric, cured at about 190° F. for four days, and is then ready for use. In this example, the "Aroclor" is a plasticizer for the benzylcellulose and in its stead other well-known plasticizers for cellulose ethers may be used, such as "Paraplex," which is a sebacic acid ester; "Santicizer," which is a methyl phthalyl ethyl glycolate; or the like.

Where a hard product suitable for molding under heat and pressure is desired, the quantity of ethylcellulose is materially increased so that the binder may comprise as much as 80% of ethyl cellulose and 20% tall oil.

Certain specific examples have been recited in which preferred proportions of the ingredients are given but I do not wish to be limited to any such proportioning or to any specific modifiers for the tall oil or cellulose ether or the composition formed of the cellulose ether modified tall oil. My invention comprehends broadly a composition of matter comprising tall oil and a cellulose ether selected from the group consisting of ethylcellulose and benzycellulose which are compatible with the tall oil, for I have discovered that an unusual binding value is obtained by the combination of these two ingredients, more than obtained by the plasticizing of cellulose ether with commercially available plasticizers and greater than that obtained by the use of tall oil alone. In a more limited aspect, my invention contemplates a heat cured mixture of tall oil and a compatible cellulose ether. In the examples, ethylcellulose and benzylcellulose are recited. Other cellulose ethers which are compatible with the tall oil may be used.

The invention is not limited to the specific embodiments given for purposes of explaining the same but may be otherwise embodied and practiced within the scope of the following claims.

I claim:
1. A composition of matter suitable for use as a floor or wall covering in sheet form comprising a mass resistant to alkali attack and having an initial penetration as herein defined of not more than 75% after immersion for 18 hours in a 2% solution of sodium hydroxide composed of a heat-cured binder formed of a compatible mixture of a major portion by weight of tall oil and a minor portion by weight of an alkali-insoluble ethylcellulose rendered compatible by heating the tall oil and ethylcellulose together until compatibility is obtained, and filling material.

2. A composition of matter in accordance with claim 1 in which the initial penetration is not more than 50%.

3. A composition of matter suitable for use as a floor or wall covering in sheet form comprising a mass resistant to alkali attack and having an initial penetration as herein defined of not more than 50% after immersion for 18 hours in a 2% solution of sodium hydroxide composed of 60% to 80% by weight of filling material and about 20% to 40% by weight of a heat-cured binder comprising a compatible mixture of tall oil and an alkali-insoluble ethylcellulose rendered compatible by heating the tall oil and ethylcellulose together until compatibility is obtained.

4. A method of increasing the toughness and strength of tall oil compositions comprising adding thereto a minor proportion by weight of an alkali-insoluble cellulose ether selected from the group consisting of ethylcellulose and benzylcellulose, heating the mixture to obtain compatibility, forming, and thereafter heat curing.

5. A composition of matter comprising coumarone indene resin and a compatible mixture obtained by heating a major proportion of tall oil and a minor proportion of an alkali-insoluble cellulose ether selected from the group consisting of ethylcellulose and benzycellulose.

6. A composition of matter comprising the product obtained by heating a major portion by weight of tall oil and a minor portion by weight of an alkali-insoluble ethylcellulose until a compatible mixture is obtained.

7. A composition of matter comprising the product obtained by heating at a temperature of about 300° F. 60% to 70% by weight of tall oil and 30% to 40% of an alkali-insoluble ethylcellulose until a compatible mixture is obtained.

8. A floor or wall covering in sheet form comprising a mass resistant to alkali attack and having an initial penetration as herein defined of not more than 75% after immersion for 18 hours in a 2% solution of sodium hydroxide composed of filling material and a heat-cured binder including 60% to 70% of tall oil and 30% to 40% of an alkali-insoluble ethylcellulose rendered compatible by heating the tall oil and ethylcellulose together until compatibility is obtained.

9. In a method of making floor or wall coverings or the like, the steps comprising (a) heating 60% to 70% by weight of tall oil in the presence of 30% to 40% by weight of an alkali-insoluble ethylcellulose until the ingredients are completely dissolved and a compatible binder mixture is obtained, (b) mixing the binder product of step (a) with filling material, (c) forming the mix into the desired shape, and (d) curing the binder by heating the formed product of step (c) until it has an initial penetration as herein defined of not more than 75% after immersion for 18 hours in a 2% solution of sodium hydroxide.

10. A composition of matter comprising the product obtained by heating together a major portion by weight of tall oil, a minor portion by weight of an alkali-insoluble cellulose ether selected from the group consisting of ethylcellulose and benzylcellulose, and a plasticizer for the cellulose ether until a compatible mixture is obtained.

11. A composition of matter comprising the product obtained by heating a major portion by weight of tall oil and a minor portion by weight of an alkali-insoluble cellulose ether selected from the group consisting of ethylcellulose and benzylcellulose.

12. A composition of matter suitable for use as a floor or wall covering comprising the product obtained by heating a major portion by weight of tall oil and a minor portion by weight of an alkali-insoluble ethylcellulose until a compatible mixture is obtained.

13. A composition of matter comprising a major portion by weight of cork particles and a minor portion by weight of a binder therefor composed of the product obtained by heating a major portion by weight of tall oil and a minor portion by weight of an alkali-insoluble ethylcellulose until a compatible mixture is obtained.

14. A composition of matter comprising the product obtained by heating a major portion by weight of tall oil and a minor portion by weight of an alkali-insoluble cellulose ether selected from the group consisting of ethylcellulose and benzylcellulose until a compatible mixture is obtained and thereafter heat-curing the compatible mixture.

WARREN STUBBLEBINE.

REFERENCES CITED

The following references are of record in the file of this patent:

UNITED STATES PATENTS

| Number | Name | Date |
|---|---|---|
| 2,145,648 | Fawkes | Jan. 31, 1939 |
| 2,148,642 | Ricard | Feb. 28, 1939 |
| 2,240,365 | Dreger | Apr. 29, 1941 |
| 2,277,287 | Beckman et al. | Mar. 24, 1942 |
| 2,306,352 | Burrell | Dec. 22, 1942 |

OTHER REFERENCES

Lorand Pages 527-529 Ind. & Eng. Chem. May 1938, pages 1 and 2 "Hercules Ethyl Cellulose for Varnishes," pub. 1939 by Hercules Powder Co.